United States Patent [19]

Chen et al.

[11] 4,213,847

[45] Jul. 22, 1980

[54] CATALYTIC DEWAXING OF LUBES IN REACTOR FRACTIONATOR

[75] Inventors: Nai Y. Chen, Titusville, N.J.; Ikai Wang, Hsinchu, Taiwan

[73] Assignee: Mobil Oil Corporation, New York, N.Y.

[21] Appl. No.: 39,468

[22] Filed: May 16, 1979

Related U.S. Application Data

[63] Continuation-in-part of Ser. No. 922,915, Jul. 10, 1978.

[51] Int. Cl.² ............... C10G 13/10; C10G 13/16; C10G 41/00

[52] U.S. Cl. .................. 208/111; 203/28; 203/29; 203/DIG. 6; 208/18; 208/59; 208/83; 208/93; 208/166; 208/253; 208/297

[58] Field of Search ............ 203/DIG. 6, 28; 208/59, 208/89, 103, 111, 146, 166, 213–216, 18, 251 H, 252, 253

[56] References Cited

U.S. PATENT DOCUMENTS

| | | | |
|---|---|---|---|
| Re. 28,398 | 4/1975 | Chen et al. | 208/111 |
| 2,741,582 | 4/1956 | Evans et al. | 208/166 |
| 3,091,586 | 5/1963 | Pappas et al. | 208/210 |
| 3,124,526 | 3/1964 | Butler et al. | 208/264 |
| 3,140,322 | 7/1964 | Frilette et al. | 208/111 |
| 3,173,858 | 3/1965 | McClure | 208/158 X |
| 3,425,810 | 2/1969 | Scott | 422/191 |
| 3,483,118 | 12/1969 | Gleim et al. | 208/252 |
| 3,700,585 | 10/1972 | Chen et al. | 208/111 |
| 3,755,145 | 8/1973 | Orkin | 208/111 |
| 3,880,746 | 4/1975 | Bennett et al. | 208/59 |
| 3,960,705 | 6/1976 | Garwood et al. | 208/111 |
| 4,148,717 | 4/1979 | Young | 208/251 H |

*Primary Examiner*—Delbert E. Gantz
*Assistant Examiner*—G. E. Schmitkons
*Attorney, Agent, or Firm*—Charles A. Huggett; Raymond W. Barclay

[57] ABSTRACT

Heavy petroliferous stocks such as vacuum and atmospheric resids, tar sand oils, shale oils, liquids from conversion of coal and the like are concurrently distilled and hydroprocessed for removal of sulfur, nitrogen and metals and are hydrocracked or otherwise hydroprocessed in a packed distillation column under hydrogen pressure wherein the packing is constituted, at least to a substantial extent in both stripping and rectifying sections by catalyst suited to the desired conversions. In a specific application to catalytic hydrodewaxing of lubricating oil stocks, improvement of Viscosity Index (VI) of dewaxed product results.

9 Claims, 2 Drawing Figures

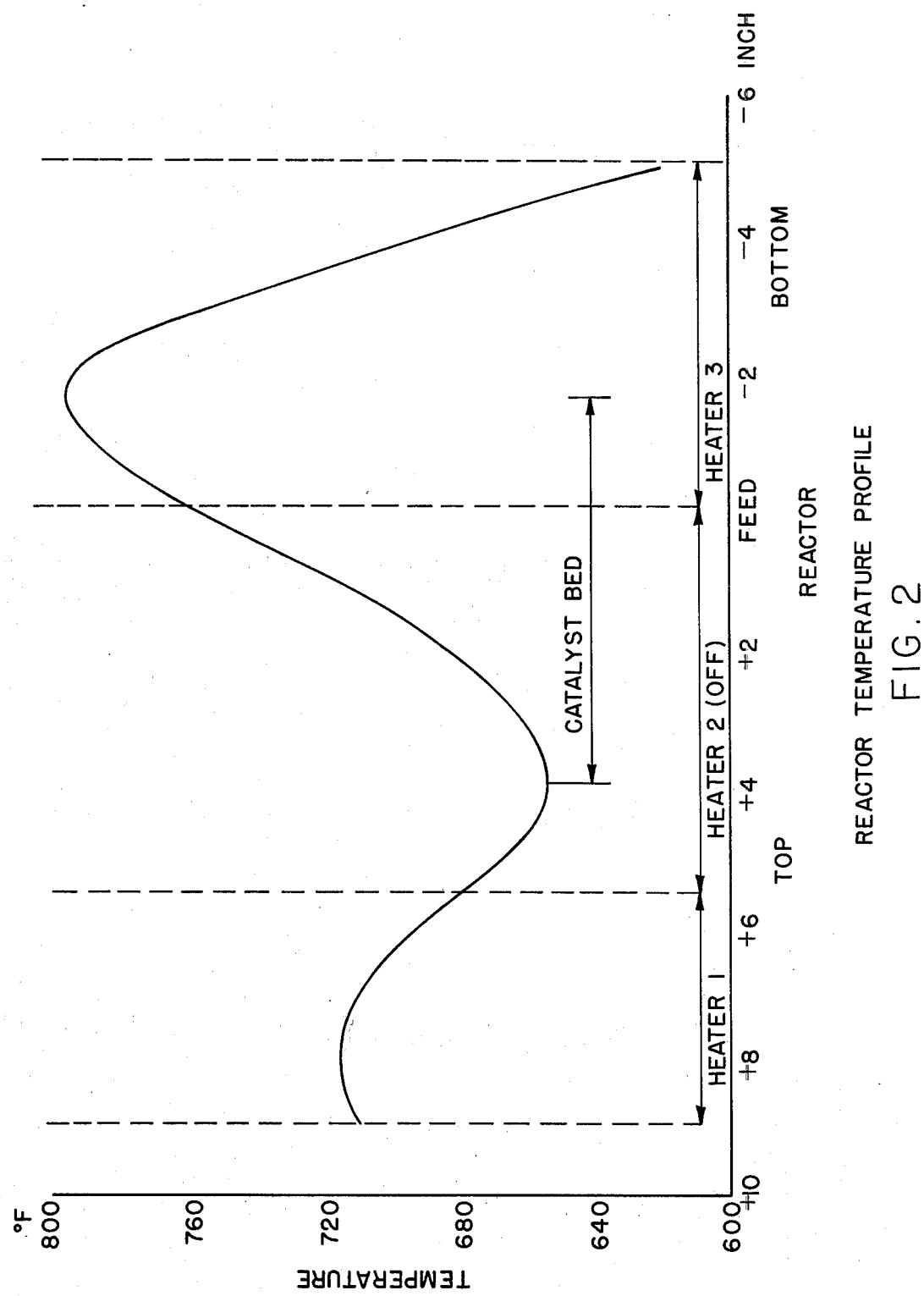

CATALYTIC DEWAXING OF LUBES IN REACTOR FRACTIONATOR

This application is a continuation-in-part of application Ser. No. 922,915, filed July 10, 1978, the entire contents of which are incorporated herein by this reference.

FIELD OF THE INVENTION

The invention is concerned with reducing wax content of hydrocarbon fractions by conversion of straight or slightly branched paraffin hydrocarbons. The conversion is accomplished by shape selective dual function catalysts in the presence of hydrogen, a technique aptly designated catalytic hydrodewaxing.

It has long been recognized that long straight chain paraffin hydrocarbons containing upwards of about 18 carbon atoms will crystallize from a solution in petroleum hydrocarbons at substantially lower temperatures than the freezepoint of other hydrocarbons of like boiling point. A fraction separated from a waxy crude oil by distillation will become incapable of flow from a vessel at a temperature (the pour point) such that the wax crystals formed will inhibit such flow. Lubricants and liquid fuels cannot be used in the intended manner at temperatures below the pour point. Difficulties due to poor pumpability and clogging of filters can be encountered at higher temperatures due to suspended wax crystals in the oil.

Dewaxing of lubricating oils has been practiced for many years by chilling the oil, usually in a solvent, and separating the wax crystals, as by filters, centrifuges and the like. A more recent development is catalytic hydrodewaxing in which a mixture of hydrogen and waxy hydrocarbon fraction is contacted at conversion conditions of temperature and pressure with a shape selective porous solid catalyst having acid activity for cracking in combination with a metallic hydrogenation/dehydrogenation catalyst. The porous solid catalyst is characterized by uniform pores which will admit only straight chain or straight and slightly branched chain aliphatic compounds and therefore converts only those compounds so admitted. Mordenite and zeolite ZSM-5 are typical.

In addition to catalytic hydrodewaxing, the invention contemplates conversion of heavy hydrocarbon stocks, particularly those containing sulfur, nitrogen and metal contaminants to provide good yields of such premium products as motor gasoline, diesel fuel, jet fuel, distillate fuel oil and kerosene. Such premium products are of lower boiling point (lower molecular weight) than the constituents of the heavy ends remaining after separation by distillation of the naturally occurring fractions suited to use in blending or other formulations of the premium products. The necessary reduction in boiling point of the constituents of the heavy stocks is generally accomplished commercially by catalytic cracking or by hydrocracking to lower molecular weight materials. In addition, the sulfur content of heavy fractions from many crudes exceeds environmentally acceptable limits. That feature is usually handled by hydrodesulfurization, a catalytic reaction under hydrogen pressure in the presence of a catalyst having hydrogenation/dehydrogenation activity such as cobalt and molybdenum oxides or sulfides on a refractory support such as alumina.

Nitrogen and metal compounds are also concentrated in the heavier stocks. These are detrimental to the activity of catalysts employed in processing of the fractions derived from heavy ends. Nitrogen compounds yield ammonia which impair the activity of catalysts for cracking, hydrocracking and reforming. Metals tend to deposit on cracking catalysts. Since the latter are employed without added hydrogen, the metals deposited from cracking of heavy petroleum fractions, primarily nickel and vanadium, result in undue conversion of cracking charge to coke and hydrogen. This not only reduces the yield of gasoline but also leads to overloading of coke burning facilities and overloading of the downstream "gas plant" for processing of the light gaseous by-products of catalytic cracking.

Similar considerations apply to the heavy fractions obtained by extraction of liquid hydrocarbons from oil shale by heating and to heavy coal liquids such as solvent refined coal (SRC). The invention contemplates treatment of all such materials for dewaxing, with or without major reduction in boiling range.

BACKGROUND OF THE INVENTION

Hydroprocessing of hydrocarbon stocks for various purposes makes use of varied catalysts, the characteristics of which are well understood in the art. Referring more particularly to catalytic hydrodewaxing, that process employs the technique described in U.S. Pat. No. 3,140,322 of providing catalytic sites in a porous crystalline aluminosilicate having uniform pore diameters on the order of molecular dimensions. Thus, conversion is restricted to those molecules which can enter through the uniform pores to contact the catalytic sites at interior surfaces of the zeolite. In one embodiment of that invention, the zeolite catalyst has pores of a dimension to admit long straight chain aliphatic compounds in the nature of petroleum wax. In the acid (protonic) form, these zeolites will crack the wax molecules to lower molecular weight compounds of lower boiling range which will not crystalize at the same pour point as the original wax and which may be removed by distillation, if desired. Among the zeolites proposed for this, mention may be made of mordenite and zeolite ZSM-5.

The preferred zeolites for catalytic hydrodewaxing are those having shape selective properties similar to that of zeolite ZSM-5 as described for that purpose in U.S. Pat. No. Re. 28,398 (of U.S. Pat. No. 3,700,595 issued Oct. 1972) Chen et al. These techniques are effective to reduce pour points and cloud points of fuels and lubricants.

It is common practice to hydrotreat certain stocks for removal of sulfur, nitrogen and metals. For example, feed for hydrocracking may be first contacted with a hydrotreating catalyst in the presence of hydrogen. The hydrotreater effluent is condensed and separated from unused hydrogen, ammonia, hydrogen sulfide and gaseous hydrocarbons such as methane for recycle to the reactor after scrubbing to remove hydrogen sulfide and ammonia. The condensate is then mixed with a further supply of hydrogen and passed through one or more beds of hydrocracking catalyst to produce products of lower boiling range than the feed. Typically, the hydrocracker is a series of beds in a vertical reactor and the charge is passed downward in concurrent flow with hydrogen. The reactions taking place are exothermic, resulting in a temperature rise in each bed. Temperature is controlled by addition of cold hydrogen between the beds.

It will be seen that the conventional hydrocracker is a multi-stage operation of first stage pretreater and second stage hydrocracker with similar reactions taking place in both stages, but to different relative degrees. In the fist stage, the predominant reactions are desulfurization, denitrogenation and demetallation with a lesser degree of cracking. The high pressure separator to provide a recycle hydrogen stream will remove methane but, for the most part, other cracked products will be retained in the feed to the hydrocracker. In the latter stage, the predominant reaction is cracking, applied alike to heavy components and to potential gasoline components derived from cracking in the first stage. Such nitrogen and sulfur compounds as remain after the first stage will be subjected to conversion reactions for removal of these contaminants.

In an effort to reduce the capital cost and operating expense of multi-stage operation, it has been proposed that the first stage (pretreater) effluent be cascaded to the second stage. This results in supply to the hydrocracker of all components of the first stage effluent.

An interesting variant on hydrotreating residual stocks is described in Franz et al. U.S. Pat. No. 3,897,329. The feed is introduced to a region intermediate two beds of cobalt-moly on alumina catalyst. Hydrogen is added with the feed. In addition, hydrogen is supplied to the bottom of the lower bed to pass countercurrent to liquid hydrocarbons flowing down through the bed. In that lower bed, desulfurization takes place at about 850° F. Vaporous products from reaction in the lower bed and those present in the charge pass up into the upper bed together with hydrogen and are there further reacted at the higher temperature of 875° F. The higher temperature in the upper bed will be effective to avoid condensation in that upper bed and return of reflux to the lower bed. As pointed out in the patent, it is not necessary that the two beds be in the same chamber, only that there be conduit means for conveying vapor and hydrogen from the lower bed to the upper bed. In effect, these patentees are providing for more severe reaction conditions (higher temperature and greater hydrogen concentration) applied to the vapor phase charge in the upper bed.

In essence, the Franz et al. patent describes a method of connecting a concurrent vapor phase reactor with a countercurrent trickle bed or mixed phase reactor without interstage separation.

Another form of multiple bed hydrotreating with intermediate supply of charge is found in Pappas et al. U.S. Pat. No. 3,091,586. Contrary to the effects of Franz et al., the Pappas et al. system provides for greatest severity of treatment for the liquid fraction which passes downwardly through three successive catalyst beds. Overcracking of vaporous products formed in any of these beds is avoided by withdrawal of the gas phase from a space above each bed. As a consequence, a fresh supply of hydrogen must be introduced to the bottom of each such bed. A somewhat similar effect is obtained in Scott, Jr. U.S. Pat. No. 3,425,810 by multiple feed and withdrawal conduits in a multi-bed hydrotreater. See also Halik et al. U.S. Pat. No. 3,211,641.

The Pappas et al. patent describes a method of connecting several countercurrent trickle bed reactors with a concurrent vapor phase reactor in the hydrofining of shale oil. Means are provided between reactors to allow the addition of hydrogen and the withdrawal of vaporous products and to conduct liquid flowing from one reactor to the reactor below. It is noted that the vaporous product from one reactor is not fed to the next reactor. Other than the specific mechanical connections, the system is not different from an installation of multi-stage reactors all placed on the ground level.

Scott's hydrotreating apparatus is basically a series of countercurrent flow reactors stacked vertically, with provisions for adding and withdrawing vapor and liquid streams from each reactor.

The fact that the reactors are stacked vertically does not differ in principle from multi-stage reactors on the ground level except that interstage circulation pumps must be provided for the ground level facility.

The Halik et al. patent describes the addition to a multi-stage-reactor system, of a confined saturation zone to dissolve hydrogen in the liquid feedstock and a lift tube which allows the liquid reactant to be recycled from the bottom of the reactor to the top of the reactor with a gaseous reactant stream (hydrogen).

Greater severity of treatment for the liquid portion of a hydrofining charge is provided in Wilson et al. U.S. Pat. No. 3,658,681. That system puts the charge through vacuum distillation to yield a vacuum overheated fraction passed downwardly through a top bed of a reactor to mix with the product of passing the vacuum bottoms upwardly through three beds of catalyst. The combined effluent is withdrawn as a single product stream. Although the Wilson et al. arrangement does afford the advantage of greater severity of treatment for the fraction needing the greater severity, it achieves that result in a rather cumbersome style, involving a pretreatment vacuum distillation and a post-treatment distillation to separate distillate and residual fuels.

SUMMARY OF THE INVENTION

It has now been demonstrated that a hydrotreater/hydrocracker combination can be so operated that it functions as distillation column as well as a reactor to discharge separate distillate and residual fractions. The system of this invention provides a temperature gradient similar to that of a distillation column, maximum temperature in the bottom, thus affording maximum severity of treatment for the heavy fraction of the charge.

Application of the new technique is found to overcome a disadvantage recently discovered in catalytic hydrodewaxing. Examination of the properties of fractions of lubricating stocks from catalytic hydrodewaxing has shown that the lower boiling portions of the stock have low viscosity index. This contrasts with solvent dewaxing which preserves the VI values throughout the boiling range of the dewaxed oil. This effect of catalytic hydrodewaxing is overcome by operating in the manner of this invention whereby the lighter portions of the charge are subjected to milder conversion conditions conducive to retention of high VI across the full boiling range.

As will be recognized, catalytic dewaxing of fuel fractions can also be practiced in the same manner. In that case the process can include hydrotreating for removal of sulfur, nitrogen, metals and the like through packing in part of the column with a suitable hydrotreating catalyst.

The charge to the process is introduced to an intermediate point in the packed column, such that a substantial portion of catalyst constitutes packing both above and below the feed point. The distillation column need not be packed only with catalysts. Catalysts may be deposited as a coating on conventional packing materials such as Raschig rings, etc. The packing may be interspaced with bubblecap plates or perforated plates. See FIG. 1. Temperature control along the length of the column is maintained at the desired gradient values by cooled reflux to the top of the column and circulation of liquid from the bottom through a heat exchanger. Hydrogen passes upwardly through the column to supply that reactant and to act as a stripping medium to aid the distillation function conducted concurrently with hydrotreating, hydrocracking and the like.

BRIEF DESCRIPTION OF THE DRAWINGS

The objects and advantages will be further understood from the description of specific embodiments below when considered in connection with the annexed drawings wherein:

FIG. 2 is a graphical illustration of the temperature profile in a laboratory scale reactor obtained during an experimental run according to the invention.

DESCRIPTION OF SPECIFIC EMBODIMENTS

Figure 1:
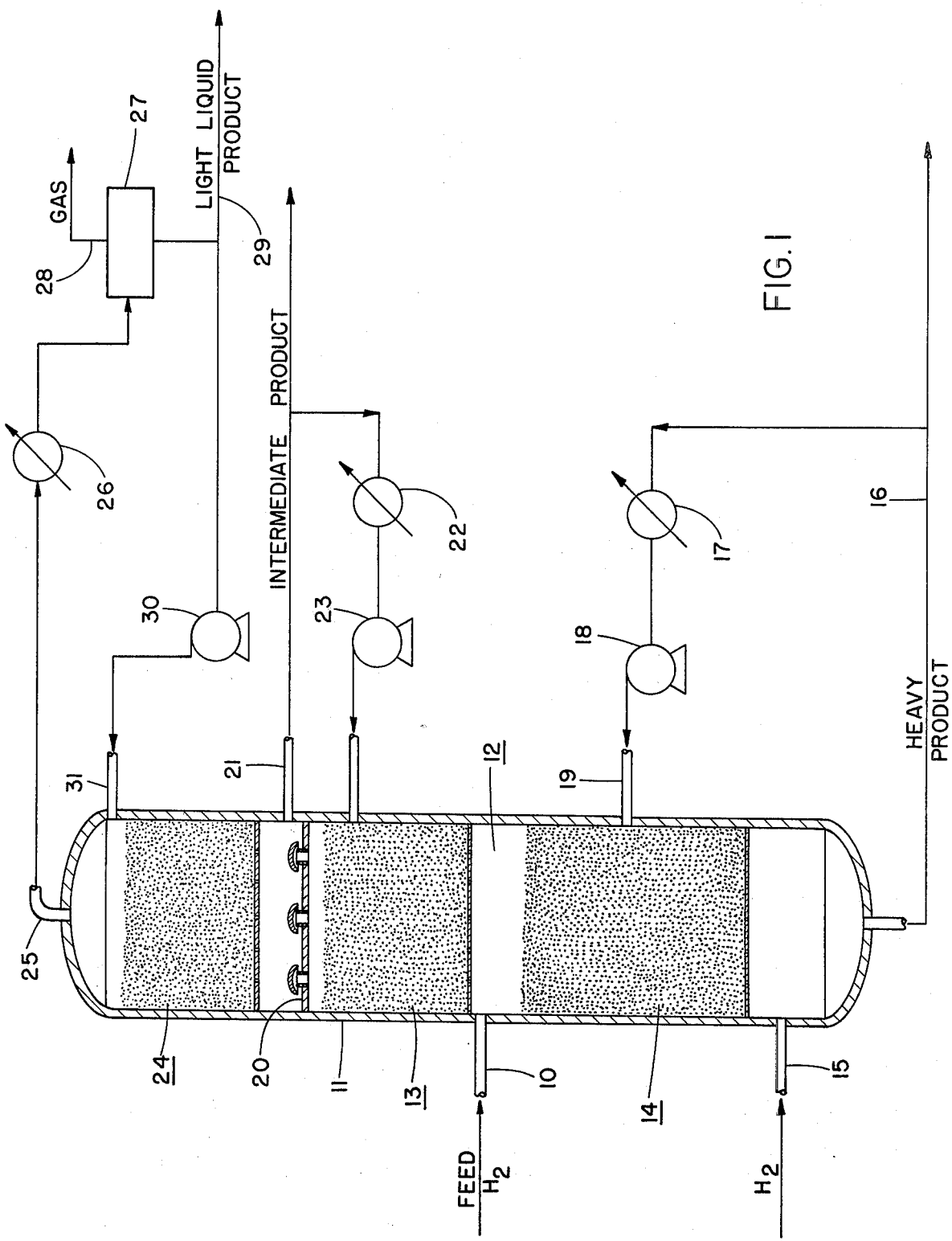
FIG. 1 is a partially diagrammatic view in vertical section of apparatus for practicing an embodiment of the invention.

In one embodiment, the present process provides means for accomplishing the functions of a vacuum distillation tower concurrently with the functions of a hydrocracker including the first stages of hydrocracker downstream fractionation and together with a treater for desulfurization of vacuum tower bottoms. Because the distillation function is conducted under hydrogen pressure in the presence of a catalyst having hydrogenation/dehydrogenation metal components, coking is inhibited. During distillation, catalytic hydrocracking and other catalytic reactions with hydrogen are conducted, notably desulfurization, denitrogenation and demetallation. By suitable choice of catalysts, the added functions of catalytic hydrodewaxing may also be conducted at the same time, e.g., by zeolite ZSM-5 combined with metal.

These results are achieved by providing a vertical column of suitable catalyst and supplying the oil to be treated at a level in the catalyst intermediate the upper and lower boundaries of catalyst while passing hydrogen upwardly through the catalyst.

The reactions occuring are exothermic, requiring that cooling be applied at intermediate portions of the bed or beds of catalyst to maintain the temperature gradient need for fractional distillation. A suitable arrangement of reactor/fractionator is illustrated in FIG. 1 for treating atmospheric column bottoms derived from the usual crude fractionator normally employed as the first stage of a refinery operation to separate crude petroleum into several fractions for further treatment. The bottoms of the atmospheric pressure column, often called atmospheric residual stock or "resid" constitute a heavy fraction in which contaminants may be concentrated. The atmospheric tower is operated at temperatures below those at which thermal cracking may occur whereby the bottoms fraction is at a temperature in the general neighborhood of 650° F.

A 650° F. fraction of that nature is the feed supplied by line 10 to reactor 11 of FIG. 1. Feed from line 10 is distributed across a plenum space 12 between catalyst bed 13 above and catalyst bed 14 below the feed point by spargers or other distributions, not shown, all as well known in the art. The fresh feed so introduced contacts hot vapors and gases rising from catalyst bed 14 and is thereby heated to a desired reaction temperature.

Liquid from the feed, together with some condensed heavy ends of the vapor rising from catalyst bed 14, flow downwardly through catalyst bed 14 countercurrent to a rising stream of hydrogen introduced at inlet 15 admixed with gaseous products of reaction in bed 14. The catalyst in bed 14 may be a hydrocracking catalyst such as palladium on silica-alumina or a hydrotreating catalyst such as cobalt/molybdenum on alumina. The amount of heat generated in bed 14 will be related to severity of reaction in that bed, governed in known manner by catalyst character, pressure, temperature and partial pressure of hydrogen. In any event, gaseous products will be generated, including light hydrocarbons; hydrogen sulfide, ammonia. Thus treated heavy ends flow from the bottom of catalyst bed 14 to accumulate in the lower portion of reactor 11 as desulfurized heavy fuel which is withdrawn at line 16. A portion of the bottoms may be recycled through heat exchanger 17, pump 18 and inlet line 19 to a mid-point of catalyst bed 14 through spargers or the like, not shown. Operation of heat exchanger 17 will be controlled to maintain a desired temperature in bed 14 having regard to extent of heat generation in that bed.

The stripping action of hydrogen passing upwardly through catalyst bed 14 may be augmented without increasing hydrogen partial pressure by adding steam or other inert gas, e.g., methane, with the hydrogen at inlet 15. As these gases rise through bed 14, lighter components of the down-flowing hydrocarbons are vaporized and passed from zone 14 of catalytic reaction at maximum temperature and hydrogen pressure. Those lighter components of the feed, together with hydrocarbon reaction products of like volatility and gases including hydrogen, hydrogen sulfide and ammonia pass into plenum space 12 from which they are distributed into the bottom of catalyst bed 13. The volatile hydrocarbons are there hydrotreated to provide premium products which pass through bubble caps or the like on tray trap 20. A liquid fraction collected on tray 20 is desulfurized distillate fuel withdrawn by line 21 as a product of the process. A portion of that product is passed through heat exchanger 22 and pump 23 for return to catalyst bed 13 where it serves as reflux and for temperature control.

Vapors and gases rising from tray 20 may be passed through a final catalytic treatment in catalyst bed 24 at the lowest temperature of the column. Heavy ends of the vapors are there condensed in part for return to trap tray 20 and the motor fuel and other light premium product components receive a final hydrotreating. The treated and fractionated light product vapor is withdrawn at line 25, condensed in heat exchanger 26 and passed to accumulator 27. A stream of hydrogen admixed with such reaction products as gaseous hydrocarbons, hydrogen sulfide and ammonia is discharged at line 28 for recovery, treating and recycle of hydrogen and recovery of by-products in the usual manner. Light liquid product discharged by line 29 will contain components of motor gasoline, jet fuel, kerosene and the like for blending with other refinery streams, possibly after further treatment such as reforming of the gasoline fraction to improve octane number. Pump 30 and inlet 31 serve for recycle of a light liquid product stream as reflux to the top of reactor/fractionator 11.

The system shown in FIG. 1 represents the best mode now contemplated for commercial application of the invention, based on small scale laboratory runs. It is recognized that scaling up from the laboratory runs presently to be described involve chemical engineering problems such as column flooding and changes in mass flow due to chemical reactants which may require departures from the arrangement herewith illustrated to attain optimal commercial use of the technique.

The experimental laboratory runs are concerned with a modified type of operation in which only two product streams are obtained, a bottoms fraction of desulfurized residual fuel and an overhead fraction containing distillate fuel, naphtha and lighter, a type of operation also contemplated as commercially advantageous. The equipment used was a laboratory microreactor for high pressure reaction. That reactor is set up for conduct of reactions under isothermal conditions, for which purpose it is enclosed by electrical heaters. To achieve the desired temperature gradient, the heater was turned off immediately above an intermediate feed point provided by modification of the reactor. The reactor column was packed with about 50 cc of commercial hydrocracker first stage catalyst of nickel-tungsten on silica-alumina. The catalyst was disposed approximately 55% above and 45% below the oil feed inlet. This arrangement is indicated graphically in FIG. 2 which also shows the temperature profile in the reactor on running a typical gas oil for hydroprocessing/distillation in accordance with the invention. In the gas oil run, feed was supplied at 10 cc per hour for liquid hourly space velocity (LHSV) of 0.2 with respect to total catalyst in the reactor, 750 psig. with hydrogen to the bottom of the reactor at a rate of 4000 standard cubic feet per barrel of charge (SCF/B). Maximum temperature above the feed inlet was 667° F., below feed inlet 775° F. Overhead from the reactor was condensed and separated from a gas phase. Nature of the feed and products is set out in Table 1.

TABLE 1

| Wt % | Gas | Overhead Distillate | Bottom | Feed |
|---|---|---|---|---|
| $C_1$ | 0.6 | | | — |
| $C_2$ | 0.5 | | | — |
| $C_3$ | 0.9 | | | |
| $C_4$ | 1.1 | 0.1 | — | — |
| $C_5$ | 0.6 | 0.5 | 0.1 | — |
| $C_6$–330° F. | 0.4 | 6.3 | 1.2 | 0.5 |
| 330–420° F. | | 5.1 | 2.0 | 2.5 |
| 420–650° F. | | 10.4 | 11.3 | 15.5 |
| 550–650° F. | | 3.7 | 20.0 | 24.5 |
| 650–800° F. | | 0.3 | 24.5 | 33.0 |
| 800+ °F. | | — | 10.5 | 24.0 |
| | 4.0 | 26.4 | 69.6 | 100 |

Two runs were conducted for hydroprocessing/distillation of atmospheric resid from Arab Light crude. Both were conducted at 1000 psig. and LHSV of 0.2 with temperature above feed inlet at 800° F. and below at 850° F. Results of a run at a hydrogen rate of 4000 SCF/B are shown in Table 2. At 8000 SCF/B, results were as shown in Table 3.

TABLE 2

| Wt % | Gas | Overhead Distillate | Bottom | Feed |
|---|---|---|---|---|
| $C_1$ | 1.6 | | | |
| $C_2$ | 1.7 | | | |
| $C_3$ | 2.7 | 0.4 | | |
| $C_4$ | 2.9 | 1.4 | | |
| $C_5$–420° F. | 2.9 | 31.4 | | |
| 420–650° F. | — | 37.4 | — | 15.9 |
| 650+ °F. | — | 0.4 | 17.2 | 84.1 |
| | 11.8 | 71.0 | 17.2 | 100 |

TABLE 2-continued

| Wt % | Gas | Overhead Distillate | Bottom | Feed |
|---|---|---|---|---|
| Product Quality | | | | |
| Ni ppm | | 0 | 0.7 | 5 |
| V ppm | | 0 | 2.8 | 18 |
| S wt % | 0 | 0.9 | 2.5 | |
| N wt % | | 0.01 | 0.07 | 0.12 |

TABLE 3

| Wt % | Gas | Overhead Distillate | Bottom | Feed |
|---|---|---|---|---|
| $C_1$ | 1.1 | | | |
| $C_2$ | 1.1 | | | |
| $C_3$ | 1.4 | — | | |
| $C_4$ | 1.2 | 0.1 | | |
| $C_5$–420° F. | 0.8 | 20.1 | | — |
| 420–650° F. | 0.5 | 47.0 | | 15.9 |
| 650–800° F. | | 17.7 | — | 23.5 |
| 800+ °F. | | 5.3 | 3.7 | 60.6 |
| | 6.1 | 90.2 | 3.7 | 100 |

The results in Table 3 are particularly interesting in demonstration that it is feasible to distill up to 800° F. end point material under pressure with hydrogen as the stripping gas simultaneously with hydrocracking and hydrotreating.

In a distillation (fractionation) column, a vapor liquid equilibrium exists between the vapor phase and the liquid phase throughout the length of the column, both above and below the feed plate. The temperature of the column increases from the top to the bottom. These conditions are fully integrated with the catalytic processing in the instant invention, i.e., the lower boiling fraction receives the milder catalytic processing, while the higher boiling fraction receives the more severe processing. The partial pressure of hydrogen also increases from top to bottom with the most refractory high boiling fraction exposed to the highest partial pressure of hydrogen.

Compared to conventional vacuum distillation, several new features in the combined process are significant:

1. The distillation is carried out under high pressure. The function of vacuum is replaced by a hydrogen containing gas stream. The fact that the distillation function can be successfully carried out under high pressure is unexpected.

2. Catalytic hydroprocessing increases the quantity of lower boiling overhead products and decreases the amount of 1000° F.+ fraction originally present in the feedstock, so that the diameter of the column above and below the feedplate may be proportionately larger and smaller than that of the respective sections of a conventional column, having regard to volume occupied by packing, etc.

3. The thermal energy required to operate a vacuum still is greatly reduced in the combined process, because hydroprocessing is exothermic, the heat generated by the reaction of hydrogen with the feedstock facilitates the distillation process. Liquid reflux to the column is obtained by exchanging the heat with the fresh feed in the reflux condensers.

In general, processing of gas oils and resids may be conducted over catalysts of Group VIII metals such as cobalt, nickel, palladium, alone or in combinations with other such metals or molybdenum or tungsten on a suitable support which may be alumina, silica-alumina, titania-zirconia or the like. Pressures will range between about 300 and 3000 psig. at LHSV of 0.25 to 2. Bottom temperatures of the reactor/fractionator may be 600°–1000° F. and top temperatures in the range of 450°–850° F. Hydrogen to hydrocarbon ratios may range upwardly from 500 SCF/B to 25,000 SCF/B. The degree of hydrocracking desired can have a profound influence on choice of catalyst. For deep hydrocracking, the catalyst should provide strong hydrogenation and acid functions, such as palladium on zeolite ZSM-5 or zeolite Y as at least a portion of the catalyst fill.

In addition to the variety of catalyst already described, other catalysts such as manganese nodules, $AlCl_3$, $ZnCl_2$, etc., particularly useful for demetalation and heavy oil processing may be slurried with the feedstock and fed to the column. In another embodiment, the catalyst bed below the feed plate may be designed as a slowly moving bed so that fresh catalyst may be added and deactivated catalyst removed from the column either continuously or intermittently.

Catalysts which contain zeolite ZSM-5 or other zeolite of like proportions are particularly advantageous in upgrading of whole waxy crudes because of the capacity of that zeolite for selective hydrocracking of long chain normal paraffins.

In one preferred embodiment, the invention provides an improved catalytic hydrodewaxing process for producing high viscosity index lube oil basestocks. In this form of the invention the distillation column is packed with a suitable hydrodewaxing catalyst, preferably a metal combined with a zeolite having a silica/alumina ratio above 12 and a constraint index between about 1 and about 12.

Because the temperature is highest at the bottom section of the column the heavier fractions are more severely processed than the light fractions. This results in a lube stock having a higher VI than would result from uniformly severe processing of all fractions. The activity of the catalyst placed in the various sections of the column can also be chosen so as to realize yet another degree of control. Thus distillate and deasphalted residual lube stocks are processed in the hydrodistillation column with flow of hydrogen countercurrent to the flow of the liquid stream. Dewaxed products are withdrawn from the column at different heights along the column. Preferably, the lighter products from upper portions of the column are combined with the bottom stream to reconstitute the lube fraction in dewaxed condition.

The preferred catalysts for hydrodewaxing are those zeolites having a constraint index within the approximate range of 1 to 12. These zeolites retain a degree of crystallinity for long periods in spite of the presence of steam at high temperature which induces irreversible collapse of the framework of other zeolites, e.g. of the X and A type. Furthermore, carbonaceous deposits when formed, may be removed by burning at higher than usual temperatures to restore activity. In many environments the zeolites of this class exhibit very low coke forming capability, conducive to very long times on stream between burning regenerations.

An important characteristic of the crystal structure of this class of zeolites is that it provides constrained access to, and egress from the intracrystalline free space by virtue of having a pore dimension greater than about 5 Angstroms and pore windows of about a size such as would be provided by 10-membered rings of oxygen atoms. It is to be understood, of course, that these rings are those formed by the regular disposition of the tetrahedra making up the anionic framework of the crystalline aluminosilicate, the oxygen atoms themselves being bonded to the silicon or aluminum atoms at the centers of the tetrahedra. Briefly, the preferred type zeolites useful in this invention possess, in combination a silica to alumina mole ratio of at least about 12; and a structure providing constrained access to the crystalline free space.

The zeolite will have a silica-alumina ratio greater than 12. The silica to alumina ratio referred to may be determined by conventional analysis. This ratio is meant to represent, as closely as possible, the ratio in the rigid anionic framework of the zeolite crystal and to exclude aluminum in the binder or in cationic or other form within the channels. Such zeolites, after activation, acquire an intracrystalline sorption capacity for normal hexane which is greater than that for water, i.e. they exhibit "hydrophobic" properties. It is believed that this hydrophobic character is advantageous in the present invention.

The type of zeolites described freely sorb normal hexane and have a pore dimension greater than about 5 Angstroms. In addition, the structure must provide constrained access to large molecules. It is sometimes possible to judge from a known crystal structure whether such constrained access exists. For example, if the only pore windows in a crystal are formed by 8-membered rings of oxygen atoms, then access by molecules of larger cross-section than normal hexane is excluded and the zeolite is not of the desired type. Windows of 10-membered rings are preferred, although, in some instances, excessive puckering or pore blockage may render these zeolites ineffective. Twelve-membered rings do not generally appear to offer sufficient constraint to produce the advantageous conversions, although puckered structures exist such as TMA offretite which is a known effective zeolite. Also, structures can be conceived, due to pore blockage or other cause, that may be operative.

Rather than attempt to judge from crystal structure whether or not a zeolite possesses the necessary constrained access, a simple determination of the "constraint index" may be made by passing continuously a mixture of an equal weight of normal hexane and 3-methylpentane over a sample of zeolite at atmospheric pressure according to the following procedure. A sample of the zeolite, in the form of pellets or extrudate, is crushed to a particle size about that of coarse sand and mounted in a glass tube. Prior to testing, the zeolite is treated with a stream of air at 1000° F. for at least 15 minutes. The zeolite is then flushed with helium and the temperature adjusted between 550° F. and 950° F. to give an overall conversion between 10% and 60%. The mixture of hydrocarbons is passed at 1 liquid hourly space velocity (i.e., 1 volume of liquid hydrocarbon per volume of zeolite per hour) over the zeolite with a helium dilution to give a helium to total hydrocarbon mole ratio of 4:1. After 20 minutes on stream, a sample of the effluent is taken and analyzed, most conveniently by gas chromatography, to determine the fraction remaining unchanged for each of the two hydrocarbons.

The "constraint index" is calculated as follows:

$$\text{Constraint Index} = \frac{\log_{10}(\text{fraction of n-hexane remaining})}{\log_{10}(\text{fraction of 3-methyl pentane remaining})}$$

The constraint index approximates the ratio of the cracking rate constants for the two hydrocarbons. Zeolites suitable for the present invention are those having a constraint index in the approximate range of 1 to 12. Constraint Index (CI) values for some typical zeolites are:

| ZEOLITE | C.I. |
| --- | --- |
| ZSM-5 | 8.3 |
| ZSM-11 | 8.7 |
| ZSM-12 | 2 |
| ZSM-38 | 2 |
| ZSM-35 | 4.5 |
| TMA Offretite | 3.7 |
| Beta | 0.6 |
| ZSM-14 | 0.5 |
| H-Zeolon | 0.4 |
| REY | 0.4 |
| Amorphous Silica-Alumina | 0.6 |
| Erionite | 38 |

It is to be realized that the above constraint index values typically characterize the specified zeolites but that such are the cumulative result of several variables used in determination and calculation thereof. Thus, for a given zeolite depending on the temperatures employed within the aforenoted range of 550° F. to 950° F., with accompanying conversion between 10% and 60%, the constraint index may vary within the indicated approximate range of 1 to 12. Likewise, other variables such as the crystal size of the zeolite, the presence of possible occluded contaminants and binders intimately combined with the zeolite may affect the constraint index. It will accordingly be understood by those skilled in the art that the constraint index, as utilized herein, while affording a highly useful means for characterizing the zeolites of interest is approximate, taking into consideration the manner of its determination, with probability, in some instances, of compounding variables extremes.

While the above experimental procedure will enable one to achieve the desired overall conversion of 10 to 60% for most catalyst samples and represents preferred conditions, it may occasionally be necessary to use somewhat more severe conditions for samples of very low activity, such as those having a very high silica to alumina ratio. In those instances, a temperature of up to about 1000° F. and a liquid hourly space velocity of less than one, such as 0.1 or less, can be employed in order to achieve a minimum total conversion of about 10%.

The class of zeolites defined herein is exemplified by ZSM-5, ZSM-11, ZSM-12, ZSM-35, ZSM-38 and other similar materials. U.S. Pat. No. 3,702,886 describing and claiming ZSM-5 is incorporated herein by reference. ZSM-11 is more particularly described in U.S. Pat. No. 3,709,979, the entire contents of which are incorporated herein by reference.

ZSM-12 is more particularly described in U.S. Pat. No. 3,832,449, the entire contents of which are incorporated herein by reference.

ZSM-35 is more particularly described in U.S. Pat. No. 4,016,245, the entire contents of which are incorporated herein by reference.

ZSM-38 is more particularly described in U.S. Pat. No. 4,046,859, the entire contents of which are incorporated herein by reference.

The specific zeolites described, when prepared in the presence of organic cations, are catalytically inactive, possibly because the intracrystalline free space is occupied by organic cations from the forming solution. They may be activated by heating in an inert atmosphere at 1000° F. for one hour, for example, followed by base exchange with ammonium salts followed by calcination at 1000° F. in air. The presence of organic cation in the forming solution may not be absolutely essential to the formation of this type zeolite, but is preferred. It is desirable to activate this type of catalyst by base exchange with ammonium salts followed by calcination in air or about 1000° F. for from about 15 minutes to about 24 hours.

Natural zeolites may sometimes be converted to this type zeolite catalyst by various activation procedures and other treatments such as base exchange, steaming, alumina extraction and calcination, in combinations. Natural minerals which may be so treated include ferrierite, brewsterite, stilbite, dachiardite, epistilbite, heulandite, and clinoptilolite. The preferred crystalline aluminosilicate are ZSM-5, ZSM-11, ZSM-12, ZSM-35, and ZSM-38, with ZSM-5 particularly preferred.

In a preferred aspect of this invention, the zeolites hereof are selected as those having a crystal framework density, in the dry hydrogen form, of not substantially below about 1.6 grams per cubic centimeter. It has been found that zeolites which satisfy all three of these criteria are most desired. Therefore, the preferred zeolites of this invention are those having a constraint index as defined above of about 1 to about 12, a silica to alumina ratio of at least about 12 and a dried crystal density of not less than about 1.6 grams per cubic centimeter. The dry density for known structures may be calculated from the number of silicon plus aluminum atoms per 1000 cubic Angstroms, as given, e.g. on page 19 of the article on Zeolite Structure by W. M. Meier. This paper, the entire contents of which are incorporated herein by reference, is included in "Proceedings of the Conference on Molecular Sieves, London, April 1967", published by the Society of Chemical Industry, London, 1968. When the crystal structure is unknown, the crystal framework density may be determined by classical pykometer techniques. For example, it may be determined by immersing the dry hydrogen form of the zeolite in an organic solvent which is not sorbed by the crystal. It is possible that the unusual sustained activity and stability of this class of zeolites is associated with its high crystal anionic framework density of not less than about 1.6 grams per cubic centimeter. This high density, of course, must be associated with a relatively small amount of free space within the crystal, which might be expected to result in more stable structures. This free space, however, is important as the locus of catalytic activity.

Crystal framework densities of some typical zeolites are:

| Zeolite | Void Volume | Framework Density |
| --- | --- | --- |
| Ferrierite | 0.28 cc/cc | 1.76 g/cc |
| Mordenite | .28 | 1.7 |
| ZSM-5, -11 | .29 | 1.79 |
| Dichiardite | .32 | 1.72 |
| L | .32 | 1.61 |

| Zeolite | Void Volume | Framework Density |
|---|---|---|
| Clinoptilolite | .34 | 1.71 |
| Laumontite | .34 | 1.77 |
| ZSM-4 (Omega) | .38 | 1.65 |
| Heulandite | .39 | 1.69 |
| P | .41 | 1.57 |
| Offretite | .40 | 1.55 |
| Levynite | .40 | 1.54 |
| Erionite | .35 | 1.51 |
| Gmelinite | .44 | 1.46 |
| Chabazite | .47 | 1.45 |
| A | .5 | 1.3 |
| Y | .48 | 1.27 |

When synthesized in the alkali metal form, the zeolite is conveniently converted to the hydrogen form, generally by intermediate formation of the ammonium form as a result of ammonium ion exchange and calcination of the ammonium form to yield the hydrogen form. In addition to the hydrogen form, other forms of the zeolite wherein the original alkali metal has been reduced to less than about 1.5 percent by weight may be used. Thus, the original alkali metal of the zeolite may be replaced by ion exchange with other suitable ions of Groups IB to VIII of the Periodic Table, including, by way of example, nickel, copper, zinc, palladium, calcium or rare earth metals.

In practicing the desired conversion process, it may be desirable to incorporate the above described crystalline aluminosilicate zeolite in another material resistant to the temperature and other conditions employed in the process. Such matrix materials include synthetic or naturally occurring substances as well as inorganic materials such as clays, silica and/or metal oxides. The latter may be either naturally occurring or in the form of gelatinous precipitates or gels including mixtures of silica and metal oxides. Naturally occurring clays which can be composited with the zeolite include those of the montmorillonite and kaolin families, which families include the sub-bentonites and the kaolins commonly known as Dixie, McNamee-Georgia and Florida clays or others in which the main mineral constituent is halloysite, kaolinite, dickite, nacrite or anauxite. Such clays can be used in the raw state as originally mined or initially subjected to calcination, acid treatment or chemical modification.

In addition to the foregoing materials, the zeolites employed herein may be composited with a porous matrix material, such as alumina, silica-alumina, silica-magnesia, silica-zirconia, silica-thoria, silica-berylia, silica-titania as well as ternary compositions, such as silica-alumina-thoria, silica-alumina-zirconia, silica-alumina-magnesia and silica-magnesia-zirconia. The matrix may be in the form of a cogel. The relative proportions of zeolite component and inorganic oxide gel matrix may vary widely with the zeolite content ranging from between about 1 to about 99 percent by weight and more usually in the range of about 5 to about 80 percent by weight of the composite.

The invention is based on the recent discovery that the quality of hydrodewaxed lube basestocks obtained in a conventional downflow fixed bed reactor varies significantly within its boiling range. For example, a hydrodewaxed heavy neutral product of 39° F. pour point has a viscosity index of 92.9, the lowest boiling 5 vol.% of the product has a pour point of 9° F. and a viscosity index of 73. Solvent dewaxed product of the same feedstock has a nearly uniform pour point over the entire boiling range. Thus it appears that the prior catalytic dewaxing process overcracks the lighter boiling fraction and produces products of low viscosity indices. One of the solutions to this problem is to distill the feedstock into many boiling range fractions and catalytically process each fraction at a different severity. For example, with a downflow fixed bed reactor, the different boiling range fractions may be introduced to the reactor at different locations so that the residence time of each fraction in the reactor is optimally controlled to give the desired product.

The instant concept represents an alternative solution. The fractionation step and the catalytic step are integrated into a single operation, and advantage is taken of the variation in temperature of a distillation column as a process parameter such that the lighter fraction would be processed at a lower temperature than the heavier fraction. Thus a continuous change in reaction severity as a function of the boiling point of the reactant is made possible by this arrangement.

It is also contemplated that a variety of catalysts similar to ZSM-5 may be used in various parts of the distillation column. For example, large crystal ZSM-5 or ZSM-23 may be preferred near the top of the column where the lower boiling fraction would be processed; and the microcrystalline ZSM-5 or ZSM-11 may be preferred near the bottom of the column where the residual fraction would be the reactant.

Conditions in the hydrodewaxing column will be generally those described in U.S. Pat. No. Re. 28,398, (of U.S. Pat. No. 3,700,585) the entire contents of which are hereby incorporated by reference. The temperature is intentionally varied from top to bottom of the column in order to achieve the desired distillation effect within a range of about 650° F. to about 1000° F. The pressure will be between about 100 and 3000 psig, preferably from 200 to 700 psig. Liquid hourly space velocity is much higher in the lower portion of the reactor than in the top section for reasons stated above. That space velocity for the lower section will be generally between about 0.1 and 10 volumes of liquid feed per volume of catalyst per hour, preferably 0.5 to 4. Hydrogen is supplied at a ratio of 1 to 20 moles of hydrogen per mole of total hydrocarbon change, preferably a mole ratio of 4 to 12 $H_2/HC$.

The catalysts employed in this invention are constituted by a zeolite as described above in intimate combination with a hydrogenating component such as tungsten, vanadium, molybdenum, rhenium, nickel, cobalt, chromium, manganese, or a noble metal such as platinum or palladium. Such component can be exchanged into the composition, impregnated therein or physically intimately admixed therewith. Such component can be impregnated in or onto zeolite such as, for example, by, in the case of platinum, treating the zeolite with a platinum metal-containing ion. Thus, suitable platinum compounds include chloroplatinic acid, platinous chloride and various compounds containing the platinum ammine complex.

The compounds of the useful platinum or other metals can be divided into compounds in which the metal is present in the cation of the compound and compounds in which it is present in the anion of the compound. Both types of compounds which contain the metal in the ionic state can be used. A solution in which platinum metals are in the form of a cation or cationic complex, e.g., $Pt(NH_3)_4Cl_2$ is particularly useful.

Viscosity index is customarily a required specification of lube oil products. The invention provides an improved process which produces lubes fully compatible with solvent dewaxed products at a significantly lower cost.

We claim:

1. A process for catalytic, shape selective hydrodewaxing of lubricating oil fractions with improved viscosity index of the lubricating oil product which comprises introducing such fraction to an intermediate point in a vertical column of a hydrodewaxing catalyst maintained at hydrodewaxing conditions, introducing hydrogen to said column below said intermediate point for flow upwardly in said column, maintaining a temperature gradient in said column from a maximum below said intermediate point to a minimum thereabove whereby higher boiling constituents of said fraction are caused to flow downwardly as liquid countercurrent to said hydrogen at conversion conditions while lighter constituents of said fraction and conversion products are caused to flow upwardly as vapor concurrent with said hydrogen resulting in dewaxing conversion of different constituents at different levels of severity, withdrawing liquid lubricating oil products from the bottom of said column and withdrawing from the top of said column distillate lubricating products having improved viscosity index by reason of lower severity of treatment as compared with the same fraction when so treated at the same severity as that applied to said higher boiling constituents.

2. A process according to claim 1 wherein products withdrawn from the bottom of said column are combined with lighter products withdrawn thereabove.

3. A process according to claim 1 wherein said fraction is a deasphalted residual fraction from distillation of a petroliferous crude.

4. A process according to claim 1 wherein said fraction is a distillate lubricating oil fraction.

5. A process according to claim 1 wherein said catalyst is a zeolite having a silica/alumina ratio above 12 and a constraint index between about 1 and about 12.

6. A process according to claim 5 wherein said zeolite is associated with a metal hydrogenation catalyst.

7. A process according to claim 1 wherein that portion of said hydroprocessing catalyst on a porous solid support below said intermediate point is a downwardly moving bed maintained by adding catalyst to the top of such portion below the intermediate point and by withdrawing catalyst from the bottom of such portion.

8. A process according to claim 1 wherein said lubricating oil fraction is a residual fraction and a heavy oil processing catalyst is added to said fraction before introducing said fraction to said column.

9. A process according to claim 8 wherein said heavy oil processing catalyst is aluminum chloride.

* * * * *

UNITED STATES PATENT AND TRADEMARK OFFICE
CERTIFICATE OF CORRECTION

PATENT NO. : 4,213,847
DATED : July 22, 1980
INVENTOR(S) : NAI Y. CHEN and IKAI WANG It is certified that error appears in the above-identified patent and that said Letters Patent are hereby corrected as shown below:

Column 3, line 5, "fist" should read --first--.

Column 4, line 22, "overheated" should read --overhead--.

Column 7, line 39, column heading is off.

Column 7, line 48, "$800^{30}$ °F." should read --800+ °F.--.

Column 8, line 8, column is off line.

Signed and Sealed this

Twenty-fifth Day of November 1980

[SEAL]

Attest:

SIDNEY A. DIAMOND

Attesting Officer

Commissioner of Patents and Trademarks